United States Patent [19]

Brohoff

[11] Patent Number: 6,108,533
[45] Date of Patent: Aug. 22, 2000

[54] GEOGRAPHICAL DATABASE FOR RADIO SYSTEM

[75] Inventor: Håkan Torgny Brohoff, Linköping, Sweden

[73] Assignee: Telefonaktiebolaget LM Ericsson (publ), Stockholm, Sweden

[21] Appl. No.: 08/918,546

[22] Filed: Aug. 22, 1997

[51] Int. Cl.[7] .............................. H04M 3/42; H04Q 7/20
[52] U.S. Cl. .......................................... 455/414; 455/456
[58] Field of Search .................................... 455/456, 556, 455/553, 457, 414, 432, 435, 434, 550, 403, 422, 421, 426, 554, 555, 557, 466; 340/825.3

[56] References Cited

U.S. PATENT DOCUMENTS

| | | |
|---|---|---|
| 5,155,689 | 10/1992 | Wortham . |
| 5,177,685 | 1/1993 | Davis et al. . |
| 5,208,756 | 5/1993 | Song . |
| 5,355,511 | 10/1994 | Hatano et al. ......................... 455/11.1 |
| 5,398,190 | 3/1995 | Wortham . |
| 5,402,117 | 3/1995 | Zijderhand . |
| 5,406,491 | 4/1995 | Lima . |
| 5,504,482 | 4/1996 | Schreder . |
| 5,543,789 | 8/1996 | Behr et al. . |
| 5,544,061 | 8/1996 | Morimoto et al. . |
| 5,579,535 | 11/1996 | Orlen et al. ............................ 455/33.1 |
| 5,604,676 | 2/1997 | Penzias . |
| 5,610,821 | 3/1997 | Gazis et al. . |
| 5,612,881 | 3/1997 | Moroto et al. . |
| 5,612,882 | 3/1997 | LeFebvre et al. . |
| 5,613,213 | 3/1997 | Naddell et al. ......................... 455/414 |
| 5,625,668 | 4/1997 | Loomis et al. ......................... 455/456 |
| 5,774,803 | 6/1998 | Kariya ...................................... 455/414 |
| 5,801,638 | 9/1998 | Ozaki ....................................... 455/435 |
| 5,862,490 | 1/1999 | Sasuta et al. ............................ 455/433 |
| 5,930,699 | 7/1999 | Bhatia ...................................... 455/414 |
| 5,948,041 | 3/2000 | Abo et al. ............................ 455/456 X |
| 6,035,189 | 3/2000 | Ali-Vehmas et al. .................... 455/414 |

FOREIGN PATENT DOCUMENTS

| | | | |
|---|---|---|---|
| 2160278 | 6/1996 | Canada ............................ H04Q 7/36 |
| 0767594 | 4/1997 | European Pat. Off. ......... H04Q 7/38 |
| 3516357 | 11/1985 | Germany .......................... H04B 7/26 |
| 6021641 | 2/1985 | Japan .............................. H04B 7/26 |
| 1170133 | 7/1989 | Japan .............................. H04B 7/26 |
| 4132322 | 5/1992 | Japan .............................. H04B 7/26 |
| 6276142 | 9/1994 | Japan .............................. H04B 7/26 |
| 6326651 | 11/1994 | Japan .............................. H04B 7/26 |
| 8502023 | 5/1985 | WIPO ............................. G01S 11/00 |
| 9625830 | 8/1996 | WIPO ............................. H04Q 7/38 |
| 9629836 | 9/1996 | WIPO ............................. H04Q 7/36 |
| 9636193 | 11/1996 | WIPO ............................. H04Q 7/38 |

*Primary Examiner*—Dwayne D. Bost
*Assistant Examiner*—Tracy M. Legree
*Attorney, Agent, or Firm*—Jenkens & Gilchrist, P.C.

[57] ABSTRACT

A geographical database connected to a mobile radio network contains information about consumer services within the network and about a plurality of geographic areas into which the service area of the network is divided. When a mobile station seeks to obtain information from the database by entering one or more search key words, the network determines the current geographic location of the mobile station within the network. Both the search keys and the mobile station's current location are used to search the database and return to the mobile station information about available consumer services in different zones made up of geographic areas near its current location. The input and output from the database may be voice or text.

28 Claims, 8 Drawing Sheets

GEOGRAPHICAL DATABASE FOR RADIO SYSTEM

BACKGROUND OF THE INVENTION

1. Field of the Invention

The present invention relates to radio telecommunication systems and, more particularly, to a geographical database for providing information to the subscribers of cellular radio systems.

2. Description of the Related Art

In recent years the growth of mobile radio telephone systems, particularly cellular telephone systems has been phenomenal. Such systems enable complete telecommunications facilities to be furnished to a community, city, or even an entire country without the time and expense of installing a wireline infrastructure. Moreover, radio telephone systems provide communication resources to a subscriber regardless of the physical position of the subscriber within the system or whether the subscriber is moving or stationary.

Each mobile radio telecommunication system operator must make a very large investment in infrastructure equipment, including mobile switching centers and base stations, in order to serve the geographic territory for which it has a license. As a result, each operator seeks to: (1) provide high quality telecommunication service to its subscribers at reasonable costs; (2) provide as many value added adjunctive services as possible to its subscribers in order to retain those subscribers and to attract new ones to its network; and (3) to increase its revenue from both basic telecommunication services and the provision of additional adjunctive communication services to its subscribers.

The subscribers of a mobile radio telecommunications system often move frequently and widely throughout a geographic area. This movement may take them into geographic areas with which they are personally unfamiliar. While some radio networks provide value added services to their subscribers such as dial up services which list restaurants, movies, emergency services and the like, these services are unable to identify the specific geographic location of the calling mobile station within the network and custom configure the information provided to it as a function of its current geographic location.

Often, a mobile radio subscriber, for example a mobile subscriber moving within a shopping center or even an in-door shopping mall, would be very interested in obtaining information with respect to the closest restaurant or coffee shop or speciality store of a particular type in their geographic area. Similarly, a motorist driving in an unfamiliar part of town who is running low on fuel would very interested in knowing the closest gasoline station to its current location. Likewise, a motorist seeking to get from town A to town B in an unfamiliar geographic area would also be interested in knowing the proper routes to drive in order to reach town B, particularly if roadway construction made the use of detours necessary.

While computerized navigation systems and geostationary positioning satellite systems have the capability of identifying the specific geographic position of a sensor on the face of the earth, such systems are generally not integrated with a communication system. Moreover, most communication systems are not adapted for the delivery of specific information from a database to a person requesting information of a particular type. The method and system of the present invention provides a geographical database integrated into a radio telecommunications system for providing specific information to a radio subscriber upon request. The specific information is based upon a specific request by the subscriber and may be configured to be directly associated with the current geographic position of the subscriber within the radio network.

There are numerous techniques for geographically locating a mobile station within a cellular radio system. These are used primarily for purposes for rendering emergency aid to the mobile subscriber or for configuring system resources, such as the characteristics of a directional antenna array for the specific position of a mobile subscriber. None of these systems identify the position of the mobile station with respect to other geographic elements for purposes of supplying it with information from a geographic database.

BRIEF SUMMARY OF THE INVENTION

In one aspect, the present invention includes providing geographic information from a database within a radio telecommunications network. A database is provided and connected to the network and contains a first set of specific information about consumer services available within the network and a second set of information about a plurality of geographic areas within the network and their relationship to one another. Each of the items of specific information about consumer services in the first set is associated with the information in the second set which corresponds to the geographic location within the network where the services are available to subscribers of the network. A mobile station within the network requests information from the database and information is returned from the database to the mobile station based upon a search thereof in response to the request. In one embodiment of this aspect, the type of information requested by the mobile station may require that the database know the current geographic location of the mobile station. In such a case, the current geographic location of the mobile station is determined and translated into a corresponding geographic area contained within the second set of information in the database. The geographic area and any search keys furnished by the requesting mobile station is used to search the database for the information requested.

In another aspect, the present invention includes a geographic database for a mobile radio telecommunication network which has a plurality of cells served by base stations connected to at least one mobile switching center and which enables a mobile station moving within the network to establish radio communication with the network. The geographic database is connected to the network and queriable by a mobile station from within the network over the air interface thereof The database comprises data defining a plurality of geographic zones within the network with each zone comprising a plurality of geographic areas. Each of the geographic areas contain geographic information made up of a plurality of information components and each zone is defined by the information components to have specific spacial relationships between each other and the geographic area. The database also includes data defining a plurality of elements of specific information with at least some of the elements defining consumer services available to subscribers of the radio network and at least some of the elements being directly associated with one or more of the geographic areas identifying the location at which the associated consumer service may be obtained within the network by the subscriber.

In a still further aspect, the present invention includes accessing information within a geographical database associated with a radio telecommunications system serving mobile stations moving over a geographic area. A message is sent from the mobile station to the network seeking to invoke the information service and a message acknowledging receipt of the information request message is sent by network. A specific query is sent from the mobile station to the network seeking information from the database. The current geographic location within the network of the querying mobile station is determined. The database is searched with the specific query of the mobile station and the current geographic location of the mobile station and information located within the database related to the query of the mobile station. The located information is arranged hierarchically into groups in accordance with the geographic zone with which the information has an association and is provided from the database to the querying mobile station in sequential groups in accordance with the proximity of the zone with which each group is associated to the zone in which the querying mobile station is currently located.

BRIEF DESCRIPTION OF THE DRAWINGS

For an understanding of the present invention and for further objects and advantages thereof, reference can now be had to the following description, taken in conjunction with the accompanying drawings in which.

DETAILED DESCRIPTION OF THE PREFERRED EMBODIMENT

Figure 1:
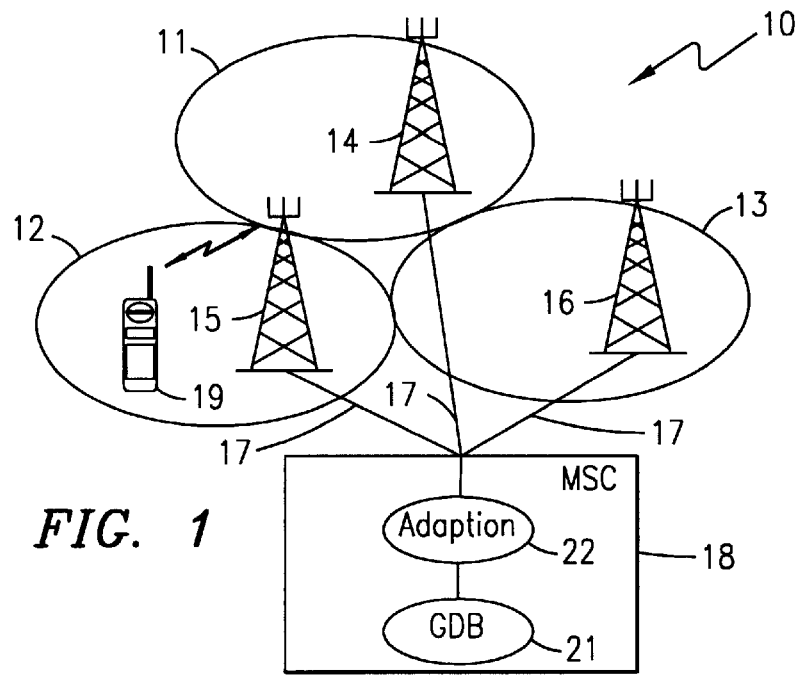
FIG. 1 is a block diagram illustrating a portion of a cellular radio system equipped with a geographic database constructed in accordance with the present invention.

Referring to FIG. 1, there is shown a block diagram of a portion of a cellular radio telecommunications system 10 including a plurality of cells 11–13 each being served by base stations 14–16, respectively. The base stations 14–16 are connected via cable or microwave links 17 to a mobile switching center 18. The mobile switching center 18 includes a geographic database (GDB) constructed in accordance with the present invention together with an interface or adaption 22 which enables the database 21 to be searched and accessed by mobile stations 19 moving within the cellular system 10. It should be understood that the GDB 21 need not be a part of the MSC 18 but could, rather, be a stand alone node, if desired.

The input to the geographic database typically includes two components: (1) the geographic area from which the inquiry originates, i.e. the geographic location of a mobile station accessing the database; and (2) a possible search key designating information a user desires to obtain from within the database. The geographic area from which the inquiry occurs could be the cell from which the service is invoked by a mobile station. However, there exist many more sophisticated methods to locate the specific position of a mobile station within a cellular radio network. Several exemplary techniques are shown and discussed in European Patent No. EP-767594, PCT Patent Application WO-9629836, PCT Patent Application WO-9625830, Japanese Patent JP06326651, Japanese Patent JP04132322, Japanese Patent JP04095791, Japanese Patent JP01170133, German Patent DE3516357, PCT Application WO8502023 and Japanese Patent JP60021641, all of which are hereby incorporated by reference herein.

One technique which produces relatively accurate mobile station position information is triangulation in which three base stations from three different cell sites are used in the location decision procedure. The more accurately the geographic location of the requesting mobile station is determined, the more precise information which can be supplied from the geographic database. A set of geographic coordinates defines the actual geographic area from which the request has originated.

A search key which may be sent from the mobile station requesting information from the geographic database to the system can be either general or specific. A general search key is also associated with either one or several specific search keys. While a specific search key is unique, a general search key is an abstraction of one or more specific search keys. For example, the general search key "food" is associated with the specific search keys "Pizza Hut", "McDonald's", and "Burger King." Each specific search key may be associated with a specific information element.

The specific information stored within the geographic database and tied to a specific search key is conveyed back to the inquiring party either as text or as a voice message in response to the inquiry. Each specific search key may be associated with one geographical area and each geographical area may be associated with an information element within the geographical database. For each specific service requested by the mobile station, the specific information that is tied to the geographical area is also conveyed back to the inquiring party either as text or as a voice message in response to the inquiry.

Figure 2:
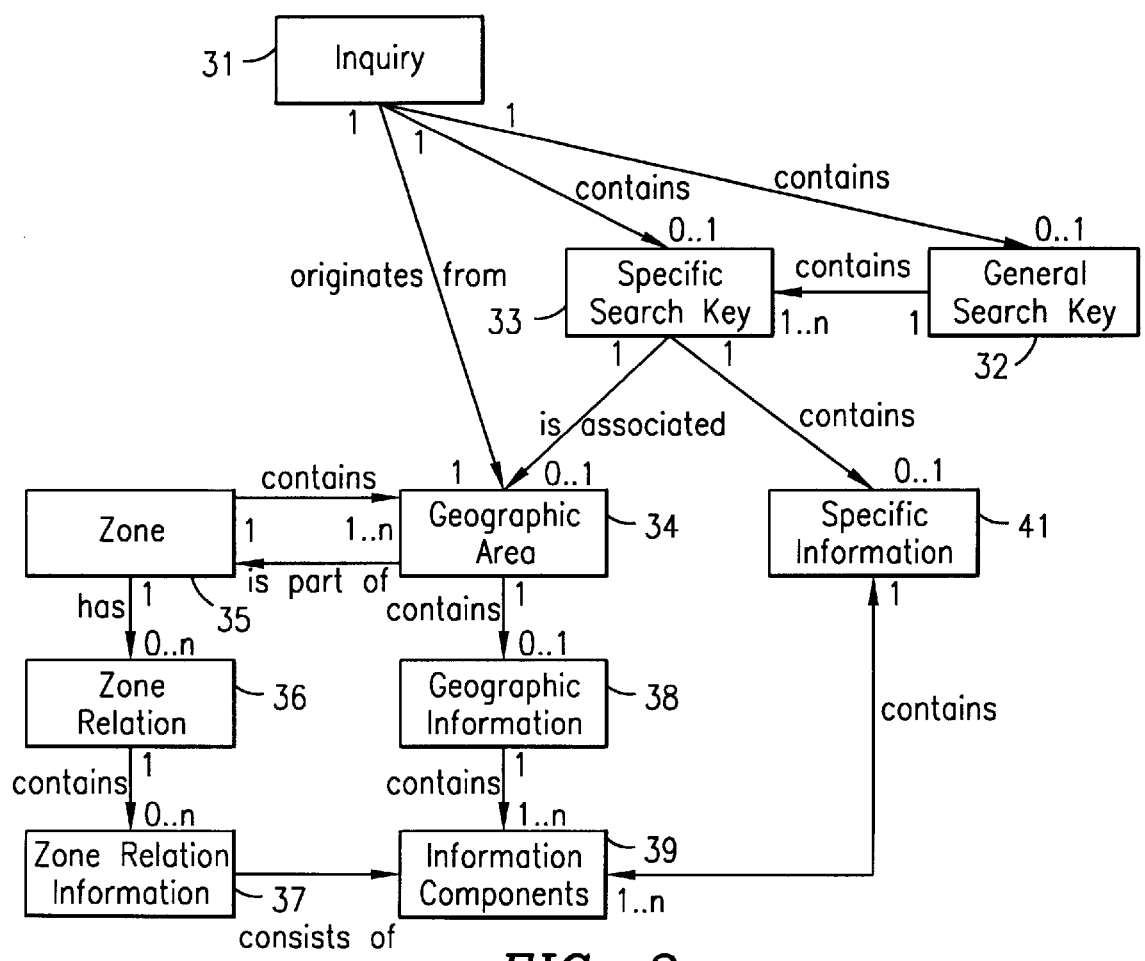
FIG. 2 is a block diagram illustrating certain elements of one aspect of the organization of a geographic database constructed in accordance with the present invention.

Referring next to FIG. 2, there is shown a block diagram illustrating the organization and relative object relations within the structure of the database of the present invention. An inquiry 31 from a mobile station operating within the cellular network 10 may contain either a general search key 32 or a specific search key 33. Similarly, the general search key may also contain one or more specific search keys 33.

The inquiry 31 also originates from a geographic area 34 which is part of a geographic zone 35. Each zone 35 contains one or more geographic areas 34. Each zone 35 also has a number of possible zone relations 36 each of which contains a zone relation element 37. The zone relationship object 36 may contain information on, for example, how to get from one zone to the other. Similarly, each geographic area contains geographic information 38 each element of which contains geographic information components 39. Each specific search key may also contain specific information 41 which is made up of specific information components 39.

A geographic area 34 may be part of one and only one zone 35. While a zone 35 may contain several geographic areas 34, each zone 35 also has certain relationships to other zones 35. The nature of this relationship may be of several different types; for example, a neighbor relationship or a separation distance relationship. The neighboring zone concept is used in the database of the present invention in order to facilitate the organization and presentation of information to an inquiring party of the geographic database.

Figure 3:
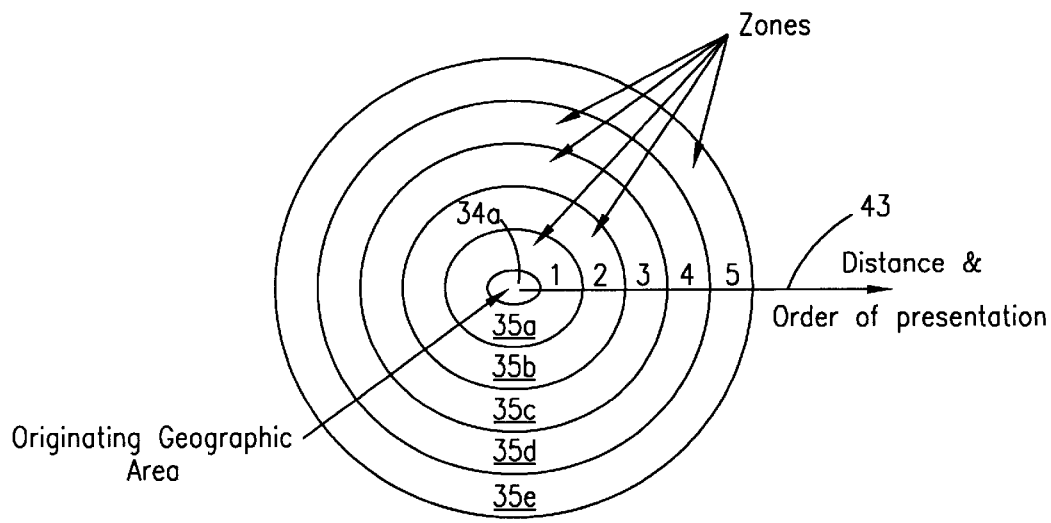
FIG. 3 is a diagram illustrating the organization of zones within the geographic database constructed in accordance with the present invention.

Referring next to FIG. 3, there is shown a pictorial diagram illustrating the concept of geographic areas and zones and showing one possible interrelationships between zones in the organization of the geographic database of the present invention. Each of the zones 35a–35e are related to one another, respectively, by concentrically surrounding one another. They are shown as being generally circular but other shapes and configurations are possible. The originating geographic area 34a is depicted as being at the center of the concentrically related zones 35a–35e. The interrelationship of the respective zones 35a–35e are shown along a scale 43 which represents relative distance of the respective zones from the originating geographic area 34a and which may also represent the requested order of presentation of information to the inquiring party from the database. The information from the database associated with the zone from which the inquiry originated is presented first. That is, since the inquiry originated from geographic area 34a which lies within the first zone 35a, information within the database that is associated with zone 35a is first presented. Thereafter, information associated with each of the other geographic areas 35b–35e are presented in a sequential and orderly fashion as belonging to the next most proximately related neighboring zones to the originating zone 35a. So also, each neighboring zone may also have neighbors and each such neighboring zone is dealt with until the system is satisfied that there are no more zones left to handle in order to present all of the information required to respond to the inquiry received by the database.

The information to be delivered to the inquiring party from the database is constructed from a plurality of information components. Each information component is a small fraction of an information message. Each of the information components can be shared among different information messages.

As mentioned above, it is generally of interest to know the geographic location of the mobile station of the inquiring party but it may also be of interest to know the position of other specific mobile subscribers within the system in order to satisfy an inquiry of the geographic database. Such geographic position information can be obtained, in certain cases, from knowledge as to the existing location or registration facilities, i.e., cells or location areas, which is used together with the geographic database to obtain information. The geographic database contains geographic information about each location area within the system.

Figure 4:
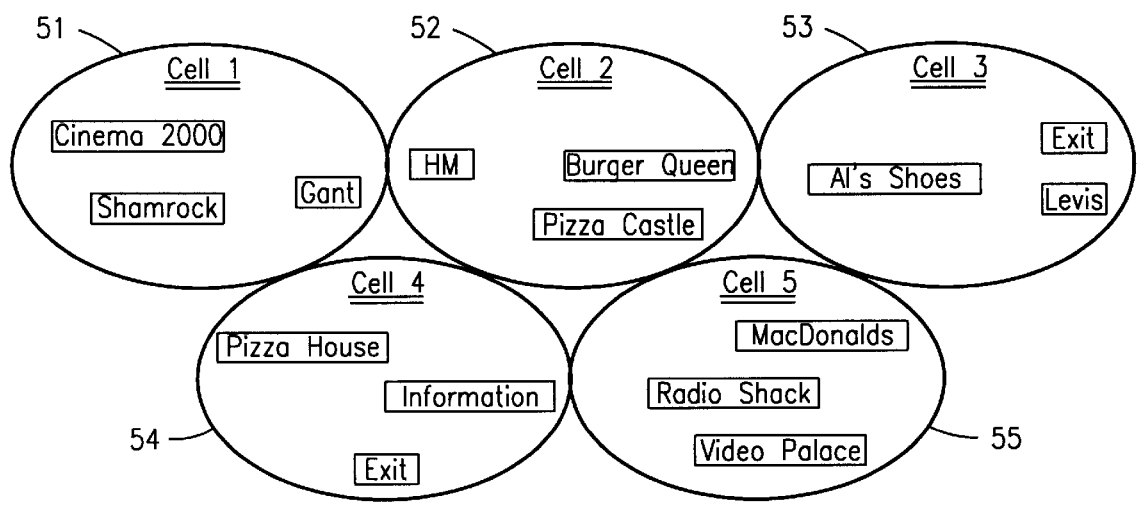
FIG. 4 is a diagram illustrating certain organizational aspects of the geographic database constructed in accordance with the present invention.
Figure 4:
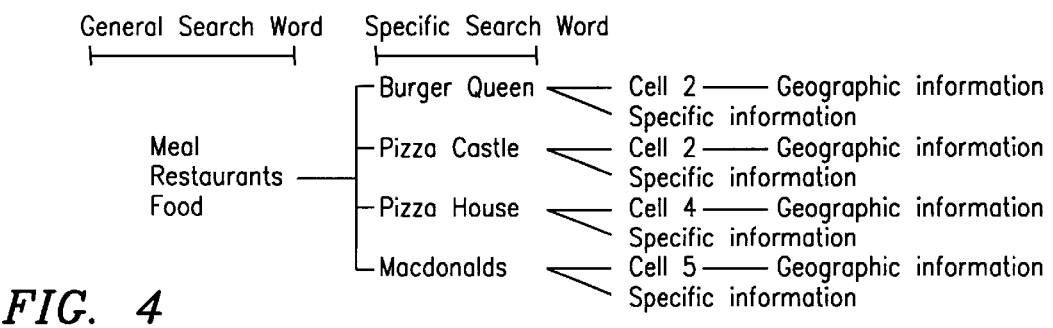
Figure 4:
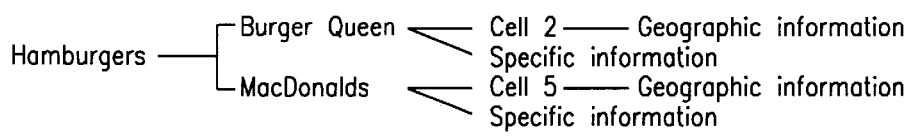

The geographic database of the present invention may be used in a number of different ways. For example, in FIG. 4 there is illustrated examples of different applications within shopping mall. In this particular example, the inquiring party is interested in obtaining information from the geographic database concerning the entire service area and, thus, the neighboring zone concept is not applied. As shown in FIG. 4, each of the cells 51–55 include a number of different geographic elements. For example, cell 51 includes the "Cinema 2000," a "Shamrock" service station and a "Gant" clothing store. Since the inquiring party is interested in information on the entire service area the geographical information input element may be omitted. The entry of a general search key word like "Food" provides four hits in the geographic database: "Burger Queen", "Pizza Castle", "Pizza House", and "McDonald's". The specific information provided by the geographic database with respect to each of these hits may include geographical information on how to get to each of the locations. The specific information may also include special offers currently being extended by each of the establishments identified by the database in response to the general word "Food". The user might also have entered other general search words, such as "hamburgers" and receive two hits from the database or might have entered a specific search word identifying any one of the food establishments and be given specific information with respect to how to reach that particular establishment, i.e. the location within the shopping mall where the establishment is located.

Figure 5:
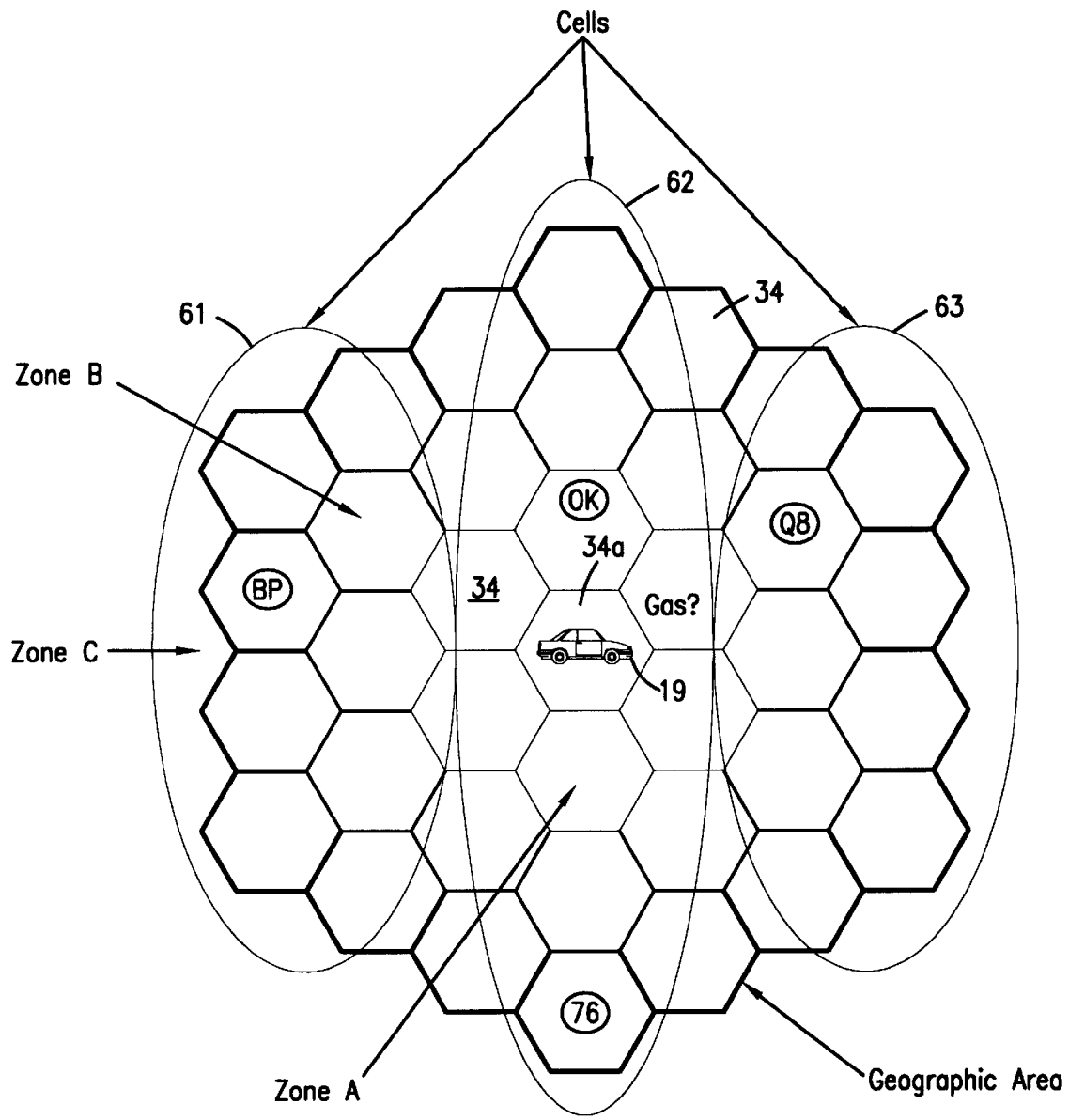
FIG. 5 is a diagram illustrating a possible relationship between different zones in the geographic database of the present invention and to the cells of a cellular radio system within which said database is integrated.

Referring next to FIG. 5, there is shown an illustrative macrosystem within which the geographic database of the present invention is implemented. In this example, the size of each of the cells 61, 62 and 63 is relatively large and each covers multiple geographic zones defined within the database. Thus, because of the size and the application, the neighboring zone concept is applied to the retrieval of information from within the database. The inquiring mobile station 19 within the originating geographic area 34a is shown as the central point of inquiry and the location about which geographic information is supplied to the database. The inquiring mobile station 19 is positioned within cell 62 and within zone A defined by the geographic database and depicted by the light color geographic areas 34. A ring of additional geographic areas, slightly shaded and defined to be zone B encircles zone A. Finally, darker shaded geographic areas 34 are defined as zone C which encircles both zone A and zone B. A number of service stations, for example, those identified by "OK" (within zone A) "Q8" (within zone B) and "BP" and "76" (within zone C) are in hierarchically organized proximate areas to mobile station 19.

Each geographic area is defined by its coordinates. The resolution of each coordinate depends upon the technique used to locate the inquiring mobile station 19. In general, it is preferred not to have geographic areas which are too small in comparison to the error which is inherent in locating the mobile station itself This results in the obtaining of better location information from the database. In FIG. 5, the entry of the general search key for the word "gas" provides several hits in the geographic database. The information is conveyed to the mobile subscriber 19 in such a way that hits that are closest to the mobile subscriber are presented first, starting with zone A, i.e. the "OK" station. Thereafter, the hits within zone B are presented and followed by the hits presented in zone C.

Figure 6:
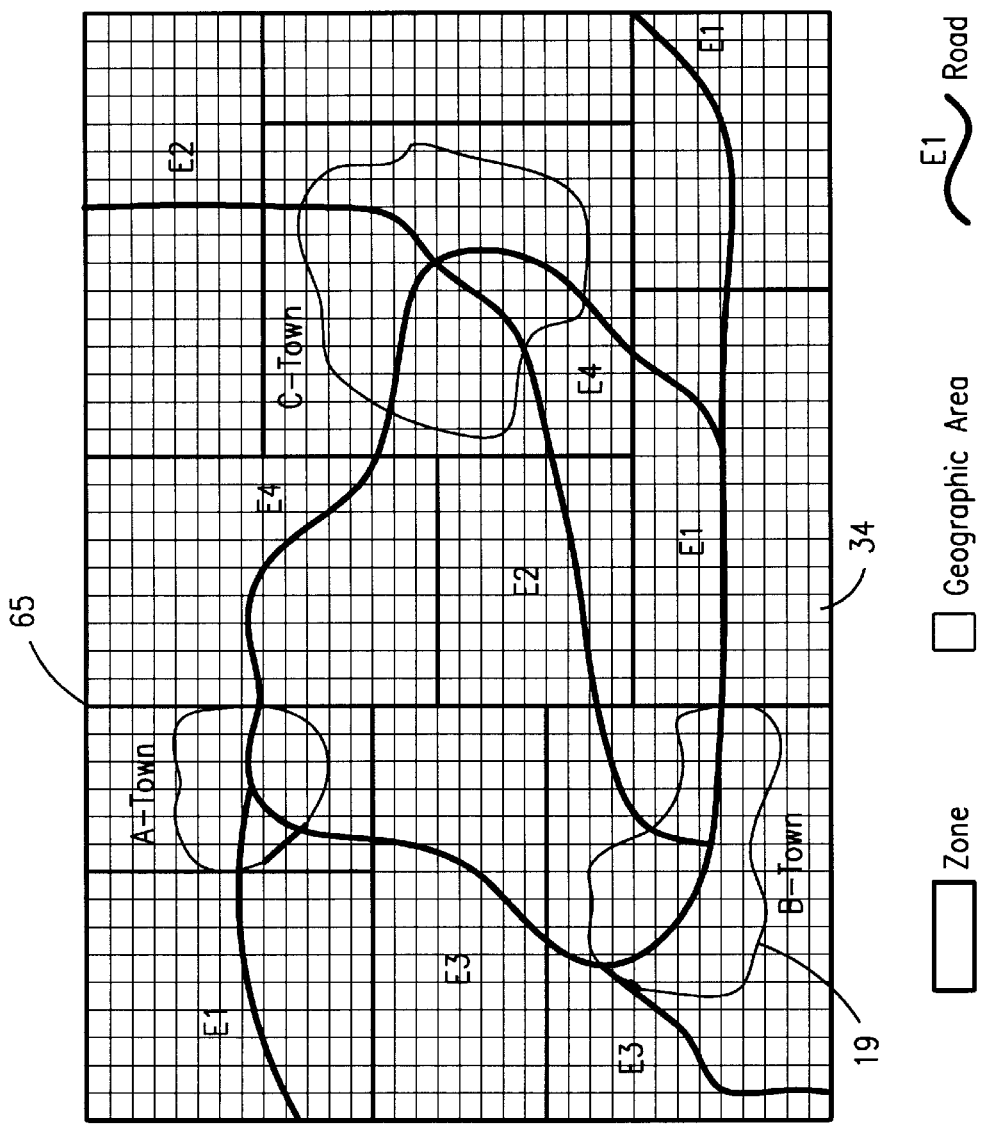
FIG. 6 is a diagram illustrating the use of zones and geographic areas within a database constructed in accordance with the present invention.

A further exemplary diagram depicting the use and organization of information within the geographic database of the present invention is illustrated in FIG. 6. In this example the database is used to obtain information about a relatively large geographic area in which the size of the cells and the zones defined within the system are relatively large. Since the inquirer is not interested in getting information concerning the entire service area the zone concept is used in the example of FIG. 6. The system is divided into geographic areas 34 a plurality of which are organized into zones 65 each bearing some relationship to the other. In this example, the inquiring mobile station is interested in getting from point A to point B and the service provides updated information with respect to road construction, routings, etc. In this type of request from an inquiring mobile station only the zone relation information is of interest and therefore the only information which is returned in response to the inquiry.

In FIG. 6, the mobile station 19 is located in B-town and would like to go to C-town. To place an inquiry the mobile station accesses the cellular network and through it the geographic database. The inquiring mobile station gives the appropriate search word "C-town". The system has from the information initially input with the request located the inquiring mobile station to be in B-town and thus accesses the database with respect to the requested search word. It then returns to the inquiring party a message directing it to take the route E-2 from B-town to C-town because there are road constructions on route E-4.

The number of zone relation information elements needed in a geographic database varies in accordance with the statistical formula:

$$\frac{n!}{((n-2)! * 2!)}$$

where n is the total number of zones defined in the system. Table I gives the number of relation information elements for various numbers of zones.

| NUMBER OF ZONE | NUMBER OF RELATION INFORMATION ELEMENTS |
|---|---|
| 10 | 45 |
| 100 | 49, 50 |
| 1,000 | 4,099,500 |
| 10,000 | 49,995,000 |

From Table I, it is apparent that this model is most suitable for smaller systems like metropolitan information systems. Search words tied to metropolitan information such as subway stations can facilitate the life for a tourist visiting a city providing this service.

Figure 7:
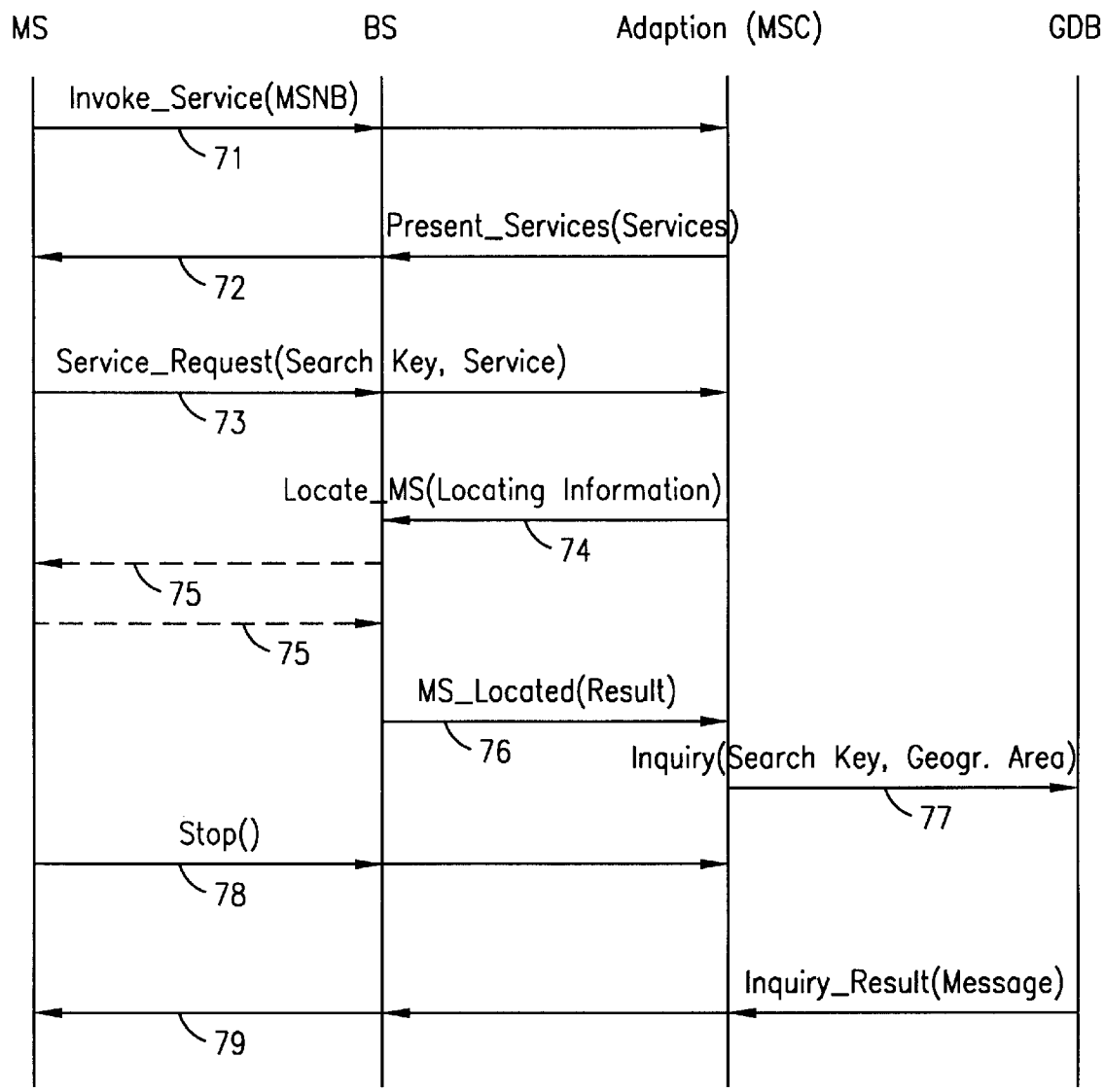
FIG. 7 is a signaling diagram depicting the flow of messages between a mobile station and the network during the use of geographic database of the present invention.

Referring next to FIG. 7, there is shown a signaling diagram illustrating the exchange of signaling messages within a cellular system in order to access and obtain information from the geographic database constructed in accordance with the present invention. As illustrated, an inquiring mobile station seeks to invoke the geographic information service by an Invoke Service message 71 sent from the mobile station to the base station and from the base station to the adaption section of the MSC. In response, the MSC returns a Present Services message 72 to the mobile station indicating the services which are currently available to it based upon the location from which the mobile sent the Invoke Service message 71. Next, the mobile station sends to the MSC at 73 a Service Request message including a search key, and selection from the list of available services. In response, the MSC sends a locate MS message 74 from the MSC to the base station. The base station institutes inquiries 75 and 76 which locate by various schemes well known in the art the inquiring mobile stations within the geographic structure of the cellular system. Once located, the base station returns an MS Located message 76 to the MSC which then forwards the Inquiry Message 77 containing the search key and the geographic area identifier for the inquiring mobile station. During the time that the search is going on within the geographic database, the mobile station has the possibility to issue at 78 a stop message aborting the search. Finally, at 79, the geographic database returns an Inquiry Result message through the MSC and base station to the mobile station providing to it the results of the search within the geographic database keyed to the inquiry.

Figure 8:
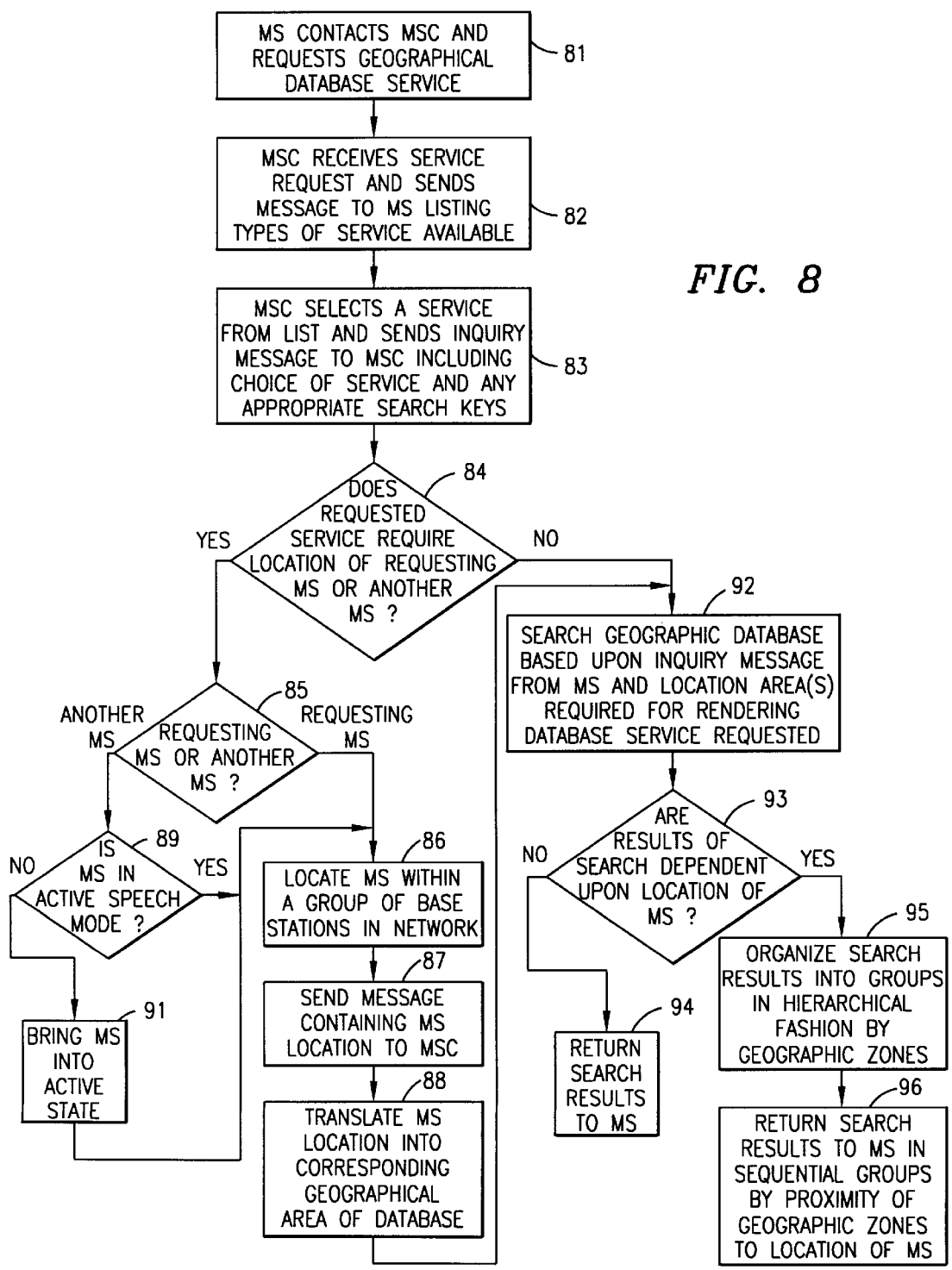
FIG. 8 is a flow chart depicting certain aspects of the use of the geographic database of the present invention.

Referring next to FIG. 8, there is shown a flow chart depicting one aspect of the method and system of the present invention. At 81 the MSC contacts the MSC to request geographical database service. The call from the mobile station originates in a cell or location area which is part of a service area. At 82 the mobile station receives the service request from the mobile station and sends a message to it listing the types of services which are available. In the present system, different geographical database services may be offered to a mobile subscriber in different service areas. For example, some of the different services include the following: (1) determining the position of one's own mobile station within the service area; (2) determining the position of another mobile station within the service area; (3) finding information which is associated with different search keys and with respect to the position of a mobile station (either the inquiring MS or another MS) within the actual service area; (4) finding information related to different search keys with respect to the entire service area; and (5) finding information which identifies and describes the relationship between two different geographic areas.

At 83, the mobile station selects one from the plurality of choices given to it in the list and then sends an inquiry message to the MSC indicating its choice of service along with any appropriate search keys. At 84, the system determines whether the service requested requires the location of either the requesting MS or some other MS.

If at 84, the system determines that no mobile station location is necessary to supply the service requested, the system moves to 92 at which it accesses the geographic database based upon the inquiry message from the mobile station and any location area or areas which might be required for performing the database search. At 93, the system determines whether the results of the search are dependent upon the location of a mobile station. If not, at 94, the system returns the search results to the mobile station. If, however, at 93, the search results requested are mobile station location dependent, at 95, the system organizes the search results into groups in a hierarchial fashion by geographic zones. At 96, search results are returned to the mobile station in sequential groups based upon the proximity of the geographic zone with which they are associated to the geographic location of the mobile station.

If the system determines that it is necessary to locate a mobile station to render the service requested, it moves to 85 and determines whether or not the mobile station to be located is the requesting mobile station or another mobile station. If it is the requesting mobile station at 86 the MSC sends the necessary request to the group of base stations near where the requesting mobile station is operating to determine its specific location in accordance with certain well known techniques. Once the location of the mobile station is determined at 87 a message is sent to the MSC which contains an identification of the mobile station location within the network. At 88, the mobile station located is translated into a corresponding geographic area identified within the database and sent to the search procedure at 92.

If, however, at 85, it is determined that the mobile station that needs to be located to supply the service requested by the requesting mobile station is a mobile station other than the requesting mobile station, the system moves to 89 and determines whether the other mobile station to be located is in active speech mode. If so, the system moves to 86 and locates the mobile station as described above. If the mobile station to be located is not in active speech mode at that time, the system moves to 91 and brings the mobile station into active state and then moves to 86 to locate the mobile station.

Each of the above referenced services cases 1–3 and 5 involve the locating of a mobile station. As mentioned above, different methods exist for locating the position of a mobile station and are well known to those skilled in the art. The locating information, such as frequencies currently assigned to mobile stations and the like which are needed for the task are sent to the base stations. The technique for locating mobile stations may involved several base stations and base station to mobile station signaling in order to determine the mobile station's precise position within the network. Determining the position of a mobile station which is not the requesting mobile station involves somewhat more sophisticated methods. In the case that the mobile station is not currently in active speech mode, it must be brought into speech mode in order to be detected and its position measured.

In the search of the geographical database 92, different techniques are used depending upon the particular type of service that has been requested by the mobile station. These include the following:

Case 1

In the case the mobile station wants to determine its own position, the input to the geographic database is the current geographical area of the mobile station as determined by the system. The geographical area contains geographic information comprising geographic information components. The geographic information is then sent to the inquiring mobile station as a search result.

Case 2

In determining the position of another mobile station, again the input to the geographical database is the geographical area currently occupied by that mobile station. This geographical area contains geographic information comprising geographic information components which are assembled and sent to the inquiring mobile station.

Case 3

In this service, the inquiring mobile station wants to find information tied to different search keys which are, in turn, related to the mobile station's current position and the actual active service area within which it is operating. The input to the geographical database is a search key and a geographic area. The search key may be a general one or it may comprise one or more specific search keys. The geographic area input to the search may be part of a zone and the database search process starts with the zone containing the input geographic area. For each geographic area in the zone which is associated with an identified specific search key, the specific information tied to the search key is presented to the mobile station. The geographic information associated with the specific geographic area may also be presented to the mobile station once per geographic area or for every identified search key as desired by the system operator or as selected by the inquiring mobile station. Specific information tied to a specific search key may also contain geographic information and this information will be more detailed than the geographic information tied to a geographic area. Neighboring zones are treated the same way until the inquiring party or the system is satisfied that there are no more zones left to be reported upon.

Case 4

In this instance the inquiring party is interested in finding information associated with different search keys but with respect to the entire service area. The input to the geographic database is a search key which may be either general or contain one or more specific search keys. Only the information tied to the identified specific search keys and the entire service area, are presented to the mobile station as search results.

Case 5

In this instance the mobile station is interested in finding relational information between two geographic areas. The input to the geographic database is a search key and a geographic area. The geographic area is the area which the inquiring mobile station is located and the specific search key is the geographic area where the mobile station would like to go. The search key is associated with the geographic area which is, in turn, part of a zone. Each zone has a relationship to the zone where the mobile station is located and this relational information is sent to the mobile station.

Figure 9:
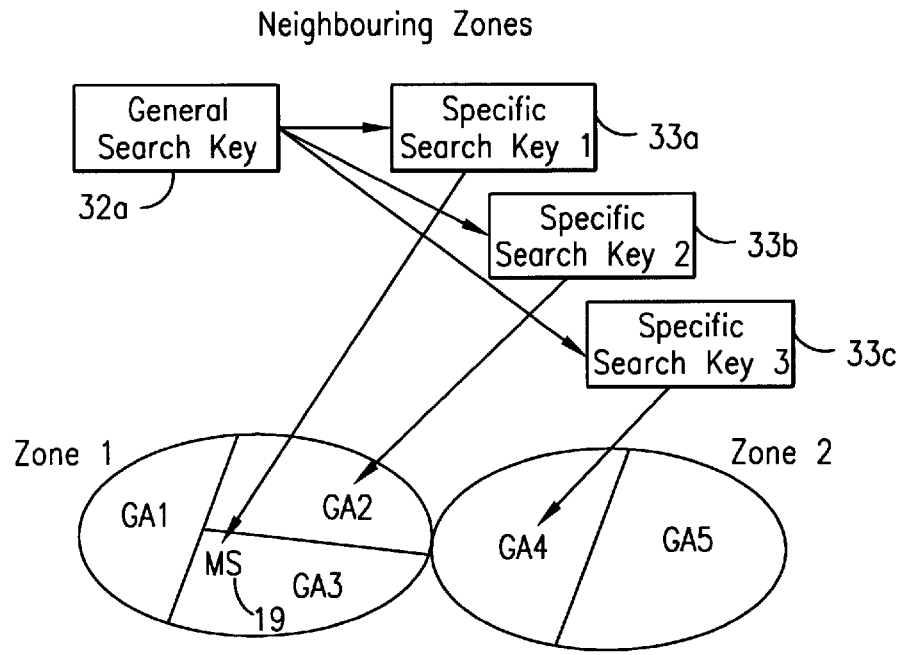
FIG. 9 is a pictorial diagram depicting one aspect of the presentation of information within the geographic database of the present invention.

In FIG. 9, another example of neighboring zone information is shown. Here a general search key 32*a* containing specific search keys 33*a*, 33*b* and 33*c* are used to inquire into information within the geographic database as requested by mobile station MS 19. Zone 1 is shown to contain geographic area GA1–GA3 while zone 2 is shown to contain geographic areas GA4–GA5. First, relevant information is returned to the mobile station with respect to its own geographic area GA3. Thereafter, information in the contiguous geographic area of zone 1, the same zone as that of the mobile station, is returned with respect to information in geographic area GA2. Finally, the results for a next related, zone 2, is returned for geographic area GA4.

Figure 10:
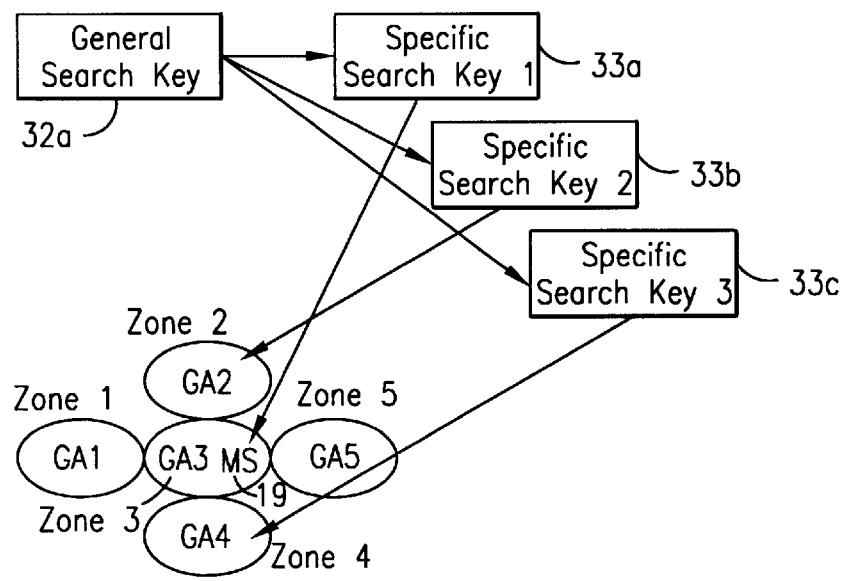
FIG. 10 is a pictorial diagram depicting another aspect of the presentation of information within the geographic database of the present invention.

In FIG. 10, there is shown a further example of geographic area relationships in which general search key 32*a* containing specific search keys 33*a*, 33*b* and 33*c*. Zone 1 contains geographic area GA1 while zone 2 contains GA2, zone 3 contains geographic area GA3 (which also includes the mobile station MS 19), zone 4 contains GA4 and zone 5 contains GA5. Again the information is presented to the mobile station in the order of presentation with respect to the proximity of relationships to the zone and geographic area of the mobile station 19. Thus, the information with respect to GA3 is first presented, information with respect to GA4 is next presented and finally information concerning GA2 is presented.

Figure 11:
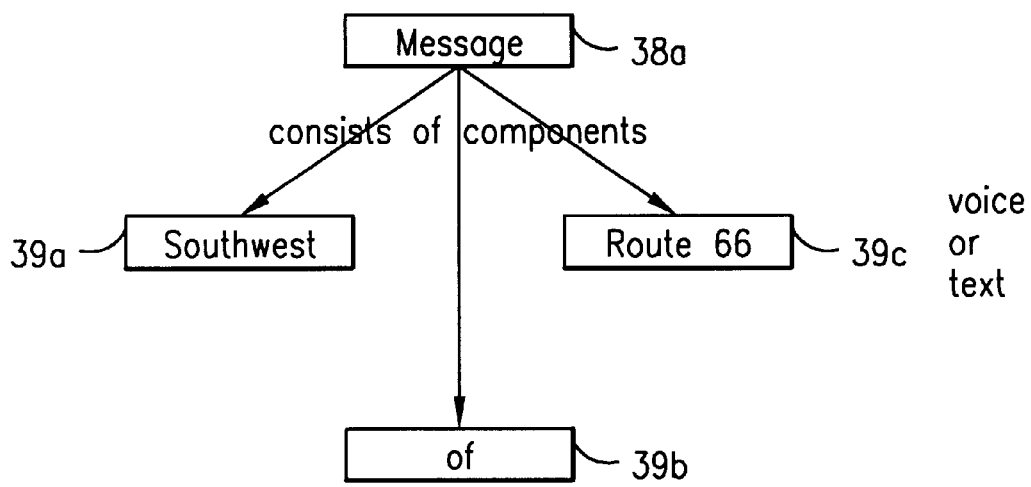
FIG. 11 is a block diagram illustrating the construction of an information request message within the geographic database of the present invention.

FIG. 11 shows a block diagram illustrating the manner in which an information message might be constructed from a plurality of information components. As shown information message 38*a* comprises information components "Southwest" 39*a*, "of'39*b* and "Route 66"3*c*. Each of these components may be embodied in either textual or vocal form and assembled by the geographic database to be furnished to the inquiring party.

Figure 12:
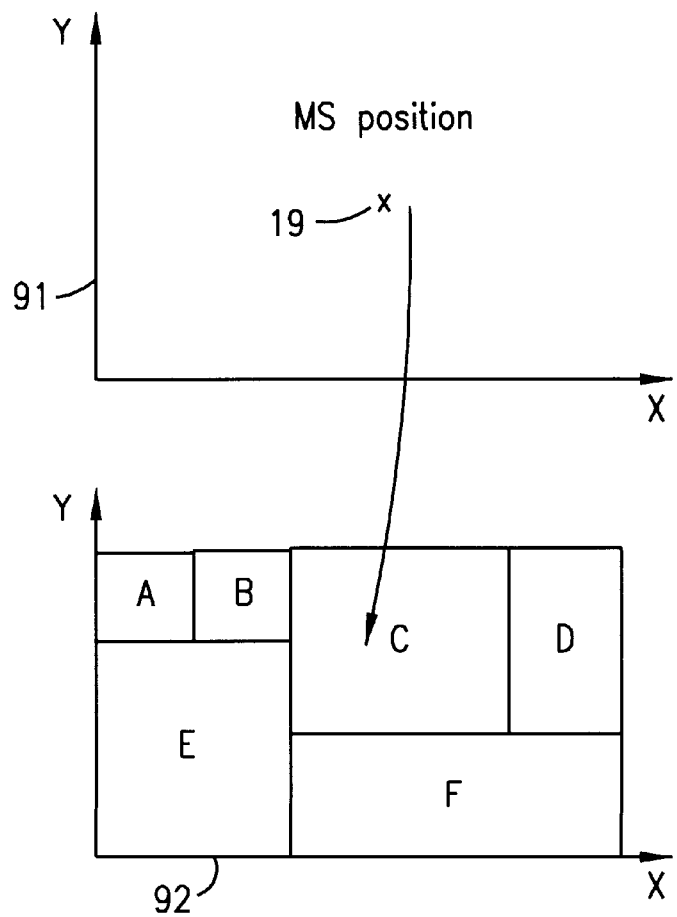
FIG. 12 is a diagram illustrating the mapping of mobile station position coordinates to geographic areas within the geographic database of the present invention.

Finally, FIG. 12 illustrates the manner in which a mobile station is positioned within the geographic database of the present invention. When an inquiry comes from a mobile station within the network, the system geographically locates the current position of the inquiring party within the system and locates that party within the various location areas and zones of the system. For example, in FIG. 12 the mobile station is located by coordinates on an XY axis. That position on the XY axis in the upper set of coordinates 91 is virtually repositioned within the lower set of XY coordinates 92 upon which already has been laid out the respective zones and location areas carried within the geographic database. This enables the database to select the information that is most relevant with respect to the inquiry.

As can be seen from the above description, the geographic database of the present invention provides a new and useful service within cellular radio telecommunications system. Such geographic locating and information providing service is very desirable for a system operator to provide to its mobile subscribers and vendors. The present system also provides a medium for marketing of various services within a network as well as assistance for a mobile subscriber in finding various geographic locations within the service area. A very generic version of the geographic database of the present invention is shown herein and it should be understood that various interfaces and functions could be used together with the database in order to achieve the services described. Additional improvements such as high resolution locating algorithm and more sophisticated database information is easily adapted to the present system.

It should be understood that while the geographic database of the present invention has been disclosed in terms of a radio telecommunication network, such as a cellular network, the present invention may also be implemented within a wireline network such as the PSTN. In such an embodiment of the present invention, a subscriber station calling into the database is identified by the A-number (or other indicator) of the calling party. The network also contains a first database (analogous to the HLR or VLR in the mobile network) which cross references each subscriber having access to the geographic database to a geographic area where it is physically located. The remainder of the access to the database and return of results to the subscriber would be essentially similar to that described above in the case of a mobile network implementation.

Although preferred embodiments of the method and apparatus of the present invention have been illustrated in the accompanying drawings and described in the foregoing description, it is understood that the invention is not limited to the embodiment(s) disclosed but it capable of numerous rearrangements, modifications and substitutions without departing from the spirit of the invention as set forth and defined in the following claims.

What is claimed is:

1. A method of providing geographic information from a database within a radio telecommunications network, said method comprising the steps of:

providing a database connected to said network and containing a first set of specific information about consumer services available within said network and a second set of information about a plurality of geographic areas within said network and their relationship to one another, each of said items of specific information about consumer services in said first set being associated with the information in said second set which corresponds to the geographic area within said network where said services are available to subscribers of said network;

requesting consumer services information from said database using a mobile station within said network;

determining a geographic location within one of the plurality of geographic areas in which the mobile station is currently located; and returning consumer services information from said database to said mobile station based upon a search thereof in response to said request, wherein said consumer services information provided to said mobile station is hierarchically arranged in groups of messages with the information on consumer services in the geographic area closest to the current location of said mobile station being delivered first and the information on consumer services in other geographic areas being delivered in order of their increasing distance from the current location of said mobile station.

2. A method of providing geographic information from a database within a radio telecommunications network as set forth in claim 1 wherein said requesting step includes:

sending a message from said mobile station within said network to said network requesting geographic database services;

returning a message from said network to said requesting mobile station containing a list of specific database services which are available to said mobile station; and sending a message from said mobile station to said network containing a selection of a database service from said list along with any appropriate search keys to enable searching of said database if said selected database service requires a search key.

3. A method of providing geographic information from a database within a radio telecommunications network as set forth in claim 2 wherein said database service selected by said mobile station includes providing said mobile station with information from said database on consumer services available in the same geographic area within which the requesting mobile station is currently located.

4. A method of providing geographic information from a database within a radio telecommunications network as set forth in claim 2 wherein said network is a cellular radio network and the database service selected by said mobile station requires the database to know the current geographic location of a mobile station and said method further comprises:

determining the current geographic location of the mobile station about which said database requires knowledge;

translating said current geographic location into a corresponding one of said geographic areas contained within said second set of information in said database;

using said geographic area and any search keys furnished by said requesting mobile station to search said database for the information requested.

5. A method of providing geographic information from a database within a cellular radio telecommunications network as set forth in claim 2 wherein said database services available to said mobile station include providing said mobile station with information from said database on consumer services available in the same geographic area within which the requesting mobile station is currently located, providing said mobile station with its current location, and providing said mobile station with information from said database on consumer services available throughout the entire network area.

6. A method of providing geographic information from a database within a radio telecommunications network as set forth in claim 2 wherein said network is a cellular radio network and the database service selected by said mobile station requires the database to know the current geographic location of said mobile station requesting said database services and said method further comprises:

taking the cell by which said mobile station is currently being served as the current geographic location of the requesting mobile station;

translating said current geographic location into a corresponding one of said geographic areas contained within said second set of information in said database;

using said geographic area and any search keys furnished by said requesting mobile station to search said database for the information requested.

7. A method of providing geographic information from a database within a cellular radio telecommunications network as set forth in claim 1 wherein said mobile station requests information about a current geographic location of another mobile station.

8. A method of providing geographic information from a database within a radio telecommunications network as set forth in claim 1 wherein said second set of information about a plurality of geographic areas within said network and their relationship to one another is organized into:

a plurality of geographic information components comprising geographic information forming geographic areas, each of said geographic areas forming part of a geographic zone comprising one or more areas;

a plurality of geographic zones; and a plurality of zone relation information components defining the relationship between each of said zones.

9. A method of providing geographic information from a database within a radio telecommunications network as set forth in claim 8 wherein said zones are organizable into concentric rings, with the intermost zone containing the location area where a mobile station requesting database service is currently located.

10. A method of providing geographic information from a database within a telecommunications network, said method comprising the steps of:

providing a database connected to said network and containing a first set of specific information about consumer services available within said network and a second set of information about a plurality of geographic areas within said network and their relationship to one another, each of said items of specific information about consumer services in said first set being associated with the information in said second set which corresponds to the geographic area within said network where said services are available to subscribers of said network;

requesting consumer services information from said database from a subscriber station within said network, wherein said requesting step includes:

sending a message from said subscriber station within said network to said network requesting geographic database services;

returning a message from said network to said requesting subscriber station containing a list of specific database services which are available to said subscriber station; and sending a message from said subscriber station to said network containing a selection of a database service from said list along with any appropriate search keys to enable searching of said database if said selected database service requires a search key, wherein said database service selected by said subscriber station includes providing said subscriber station with information from said database on consumer services available in the same geographic area within which the requesting subscriber station is currently located;

determining a geographic location within one of the plurality of geographic areas in which the subscriber station is currently located; and returning consumer services information from said database to said subscriber station based upon a search thereof in response to said request, wherein said consumer services information provided to said subscriber station is hierarchically arranged in groups of messages with the information on consumer services in the geographic area closest to the current location of said subscriber station being delivered first and the information on consumer services in other geographic areas being delivered in order of their increasing distance from the current location of said subscriber station.

11. A system for providing geographic information from a database within a radio telecommunications network, said system comprising:

means for providing a database connected to said network and containing a first set of specific information about consumer services available within said network and a second set of information about a plurality of geographic areas within said network and their relationship to one another, each of said items of specific information about consumer services in said first set being associated with the information in said second set which corresponds to the geographic area within said network where said services are available to subscribers of said network;

means for requesting consumer services information from said database using a mobile station within said network;

means for determining a geographic location within one of the plurality of geographic areas in which the mobile station is currently located; and means for returning consumer services information from said database to said mobile station based upon a search thereof in response to said request, wherein said consumer services information provided to said mobile station is hierarchically arranged in groups of messages with the information on consumer services in the geographic area closest to the current location of said mobile station being delivered first and the information on consumer services in other geographic areas being delivered in order of their increasing distance from the current location of said mobile station.

12. A system for providing geographic information from a database within a radio telecommunications network as set forth in claim 11 wherein said requesting means comprises:

means for sending said message from a mobile station within said network to said network requesting geographic database services;

means for returning a message from said network to said requesting mobile station containing a list of specific database services which are available to said mobile station; and means for sending a message from said mobile station to said network containing a selection of a database service from said list along with any appropriate search keys to enable searching of said database if said selected database service requires a search key.

13. A system for providing geographic information from a database within a radio telecommunications network as set forth in claim 12 wherein said database service selected by said mobile station includes providing said mobile station with information from said database on consumer services available in the same geographic area within which the requesting mobile station is currently located.

14. A system for providing geographic information from a database within a radio telecommunications network as set forth in claim 12 wherein said network is a cellular radio network and the database service selected by said mobile station requires the database to know the current geographic location of a mobile station and said system further comprises:

means for determining the current geographic location of the mobile station about which said database requires knowledge;

means for translating said current geographic location into a corresponding one of said geographic areas contained within said second set of information in said database;

means for using said geographic area and any search keys furnished by said requesting mobile station to search said database for the information requested.

15. A system for providing geographic information from a database within a cellular radio telecommunications network as set forth in claim 12 wherein said database services available to said mobile station include providing said mobile station with information from said database on consumer services available in the same geographic area within which the requesting mobile station is currently located, providing said mobile station with its current location, and providing said mobile station with information from said database on consumer services available throughout the entire network area.

16. A system for providing geographic information from a database within a radio telecommunications network as set forth in claim 12 wherein said network is a cellular radio network and the database service selected by said mobile station requires the database to know the current geographic location of said mobile station requesting said database services and said system further comprises:

means for taking the cell by which said mobile station is currently being served as the current geographic location of the requesting mobile station;

means for translating said current geographic location into a corresponding one of said geographic areas contained within said second set of information in said database;

means for using said geographic area and any search keys furnished by said requesting mobile station to search said database for the information requested.

17. A system for providing geographic information from a database within a cellular radio telecommunications network as set forth in claim 11 wherein said mobile station requests information about a current geographic location of another mobile station.

18. A system for providing geographic information from a database within a radio telecommunications network as set forth in claim 11 wherein said second set of information about a plurality of geographic areas within said network and their relationship to one another is organized into:

a plurality of geographic information components comprising geographic information forming geographic areas, each of said geographic areas forming part of a geographic zone comprising one or more areas;

a plurality of geographic zones; and a plurality of zone relation information components defining the relationship between each of said zones.

19. A system for providing geographic information from a database within a radio telecommunications network as set forth in claim 18 wherein said zones are organizable into concentric rings, with the intermost zone containing the location area where a mobile station requesting database service is currently located.

20. A system for providing geographic information from a database within a telecommunications network, said system comprising:

means for providing a database connected to said network and containing a first set of specific information about consumer services available within said network and a second set of information about a plurality of geographic areas within said network and their relationship to one another, each of said items of specific information about consumer services in said first set being associated with the information in said second set which corresponds to the geographic area within said network where said services are available to subscribers of said network;

means for requesting consumer services information from said database from a subscriber station within said network, wherein said requesting means comprises:

means for sending said message from said subscriber station within said network to said network requesting geographic database services;

means for returning a message from said network to said requesting subscriber station containing a list of specific database services which are available to said subscriber station; and means for sending a message from said subscriber station to said network containing a selection of a database service from said list along with any appropriate search keys to enable searching of said database if said selected database service requires a search key, wherein said database service selected by said subscriber station includes providing said subscriber station with information from said database on consumer services available in the same geographic area within which the requesting subscriber station is currently located;

means for determining a geographic location of said subscriber station within one of the plurality of geographic areas in which the subscriber station is currently located; and means for returning consumer services information from said database to said subscriber station based upon a search thereof in response to said request, wherein said consumer services information provided to said subscriber station is hierarchically arranged in groups of messages with the information on consumer services in the geographic area closest to the current location of said subscriber station being delivered first and the information on consumer services in other geographic areas being delivered in order of their increasing distance from the current location of said subscriber station.

21. A geographic database for a mobile radio telecommunication network which includes a plurality of cells served by base stations connected to at least one mobile switching center and which enables a mobile station moving within the network to establish radio communication with the network, said geographical database being connected to said network and queriable by a mobile station from within said network over the air interface thereof, said database comprising:

data defining a plurality of geographic zones within said network, each zone comprising a plurality of geographic areas;

each of said geographic areas containing geographic information made up of a plurality of information components and each zone being defined by said information components to have specific spacial relationships between each other and said geographic areas;

data defining a plurality of elements of specific information with at least some of said elements defining consumer services available to subscribers of said radio network and at least some of said elements being directly associated with one or more of said geographic areas identifying the location at which said associated consumer service may be obtained within said network by said subscriber;

means for accepting an inquiry from a mobile station requesting information related to the availability of a particular consumer service within said network;

means for determining a geographic location within one of the plurality of geographic areas in which the mobile station is currently located, means for translating said ascertained geographic location of said mobile station into a corresponding particular geographic area within the data structure of said database;

means for searching said database to locate references therein to the particular type of consumer service inquired about by said mobile station along with the geographic area information associated with each;

means for organizing said consumer service reference information into hierarchical groups in accordance with the zone within which each is available; and means for returning said consumer service reference information to said requesting mobile station in groups with the group corresponding to the zone in which the requesting mobile station is currently located being returned first and other groups in the order with which they are proximate to the zone in which the requesting mobile station is currently located.

22. A geographic database for a mobile radio telecommunication network as set forth in claim 21 wherein said zones within which said groups of consumer service reference information is organized are concentric with respect to one another.

23. A method for accessing information within a geographical database associated with a radio telecommunications system serving mobile stations moving over a geographic area, said method comprising:

sending a message from the mobile station to the system seeking to invoke the information service;

acknowledging receipt of the information request message by the system;

sending a specific query from the mobile station to the system seeking information from said database;

determining a geographic location of the querying mobile station within one of a plurality of geographic areas in which the querying mobile station is currently located;

searching the database with the specific query of the mobile station and the current geographic location of the mobile station;

locating information within the database related to the query of said mobile station;

organizing said located information hierarchically into groups in accordance with geographic zones with which said information has an association; and providing said organized information from the database to the querying mobile station in sequential groups in accordance with the proximity of the zone with which each group is associated to the zone in which the querying mobile station is currently located.

24. A method for accessing information within a geographical database associated with a radio telecommunications system serving mobile stations moving over a geographic area as set forth in claim 23 wherein the zones in accordance with which said information is organized are concentric with respect to one another and the location of the querying mobile station is at the center thereof.

25. A method for accessing information within a geographical database associated with a radio telecommunications system serving mobile stations moving over a geographic area as set forth in claim 23 wherein said information sought by said mobile station is related to consumer services available to subscribers of said telecommunication system and each of the items of said information has an association with a geographic zone within which said services are available to said subscriber.

26. A system for accessing information within a geographical database associated with a radio telecommunications system serving mobile stations moving over a geographic area as set forth in claim 25 wherein the zones in accordance with which said information is organized are concentric with respect to one another and the location of the querying mobile station is at the center thereof.

27. A system for accessing information within a geographical database associated with a radio telecommunications system serving mobile stations moving over a geographic area, said system comprising:

means for sending a message from the mobile station to the system seeking to invoke the information service;

means for acknowledging receipt of the information request message by the system;

means for sending a specific query from the mobile station to the system seeking information from said database;

means for determining a geographic location of the querying mobile station within one of a plurality of geographic areas in which the querying mobile station is currently located;

means for searching the database with the specific query of the mobile station and the current geographic location of the mobile station;

means for locating information within the database related to the query of said mobile station;

means for organizing said located information hierarchically into groups in accordance with geographic zones with which said information has an association; and means for providing said organized information from the database to the querying mobile station in sequential groups in accordance with the proximity of the zone with which each group is associated to the zone in which the querying mobile station is currently located.

28. A system for accessing information within a geographical database associated with a radio telecommunications system serving mobile stations moving over a geographic area as set forth in claim 27 wherein said information sought by said mobile station is related to consumer services available to subscribers of said telecommunication system and each of the items of said information has an association with a geographic zone within which said services are available to said subscriber.

* * * * *